(12) United States Patent
Manley

(10) Patent No.: US 9,718,501 B1
(45) Date of Patent: Aug. 1, 2017

(54) FENDER INTEGRATED AERODYNAMIC MUD, ROCK AND SPLASH GUARD

(71) Applicant: Harry Blake Manley, Hastings (CA)

(72) Inventor: Harry Blake Manley, Hastings (CA)

(*) Notice: Subject to any disclaimer, the term of this patent is extended or adjusted under 35 U.S.C. 154(b) by 0 days.

(21) Appl. No.: 15/190,631

(22) Filed: Jun. 23, 2016

(51) Int. Cl.
*B62D 25/16* (2006.01)
*B60R 19/02* (2006.01)

(52) U.S. Cl.
CPC ............ *B62D 25/161* (2013.01); *B60R 19/02* (2013.01)

(58) Field of Classification Search
CPC .. B62D 25/116; B62D 25/188; B62D 25/161; B62D 28/118; B62D 25/2018
See application file for complete search history.

(56) References Cited

U.S. PATENT DOCUMENTS

| | | | | |
|---|---|---|---|---|
| 5,207,455 A * | 5/1993 | Gotz | ...................... | B62D 25/16 280/847 |
| 6,702,329 B1 * | 3/2004 | Nishio | ...................... | B60R 3/00 280/163 |
| 6,729,652 B2 | 5/2004 | Cicansky | | |
| 6,938,930 B1 * | 9/2005 | Beach | .................. | B62D 25/188 280/848 |
| 7,284,788 B1 * | 10/2007 | Barbat | .................... | B60R 19/34 293/133 |
| 7,896,397 B2 * | 3/2011 | Rompage | ................ | B60R 13/04 280/154 |
| 8,348,333 B2 * | 1/2013 | Iammarino | .......... | B62D 21/152 296/187.09 |
| 8,651,528 B2 * | 2/2014 | Earl | ........................ | B62D 25/18 280/847 |
| 8,844,971 B2 * | 9/2014 | Tanaka | .................. | B62D 25/161 280/847 |
| 8,870,267 B2 * | 10/2014 | Zischke | ............. | B62D 25/2018 296/187.03 |
| 8,919,818 B2 * | 12/2014 | Kim | ....................... | B62D 25/16 280/847 |
| 2009/0152901 A1 * | 6/2009 | Takeuchi | ............. | B62D 25/161 296/203.01 |
| 2013/0161935 A1 | 6/2013 | Ward et al. | | |
| 2015/0034414 A1 * | 2/2015 | Arata | .................... | G10K 11/168 181/290 |

\* cited by examiner

*Primary Examiner* — Hau Phan
(74) *Attorney, Agent, or Firm* — Eric L. Lane; Green Patent Law

(57) ABSTRACT

A fender integrated aerodynamic mud, rock and splash guard for a vehicle, comprising: a) a front surface, b) a back surface, c) a fender skirt portion, d) bumper grill radiator portion, e) behind grill portion, and f) bumper tab, wherein the guard is adapted to be an extension of an inner fender skirt, wherein the guard is adapted to be an extension of an inner fender skirt, wherein the guard is affixed along a fender skirt edge, wherein the guard is configured to extend from the fender skirt edge along a portion of a front portion of a wheel well to overlap with a back portion of a front bumper, and wherein the front surface faces away from a volume of a wheel well and the back surface faces the volume of the wheel well.

15 Claims, 5 Drawing Sheets

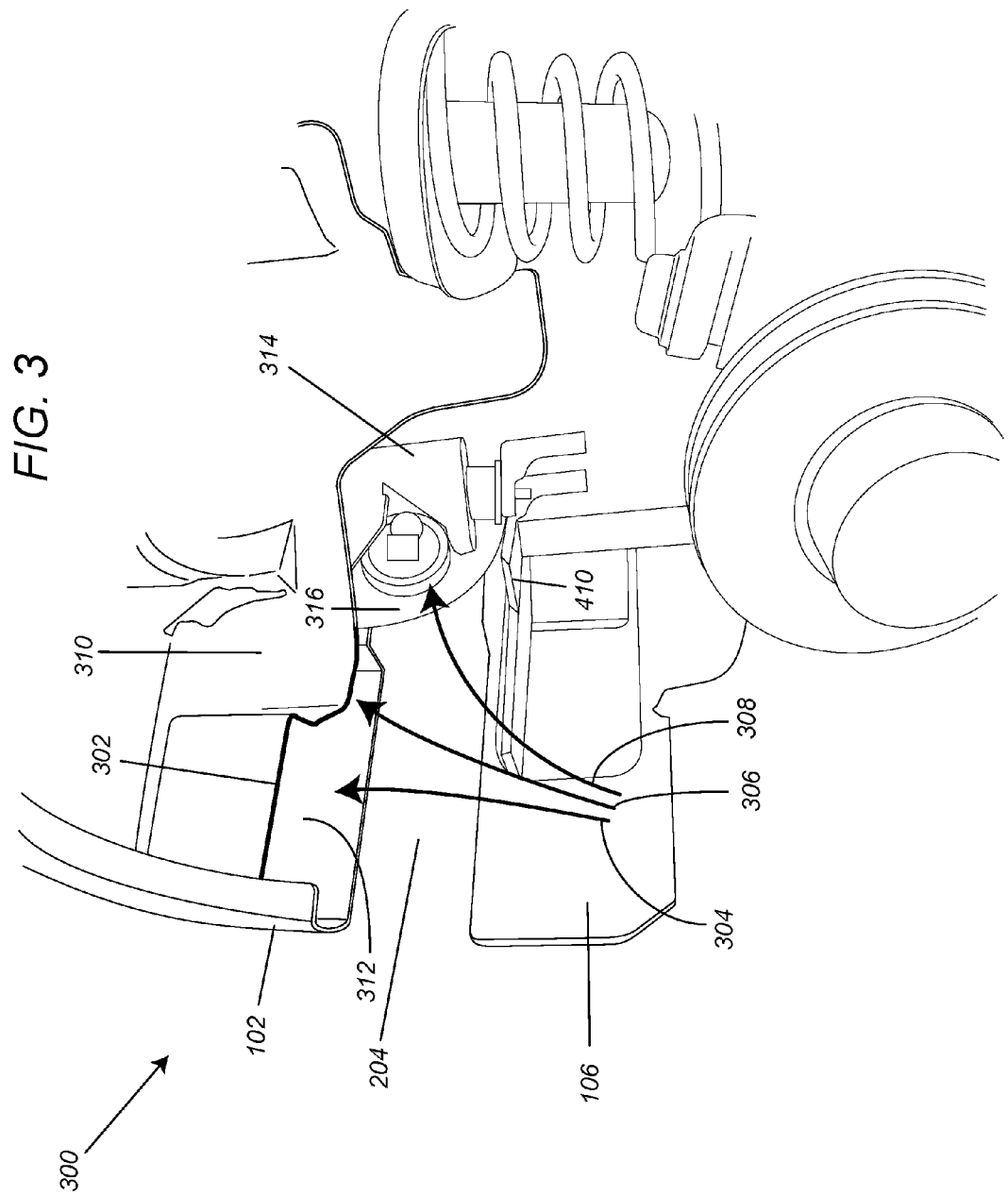

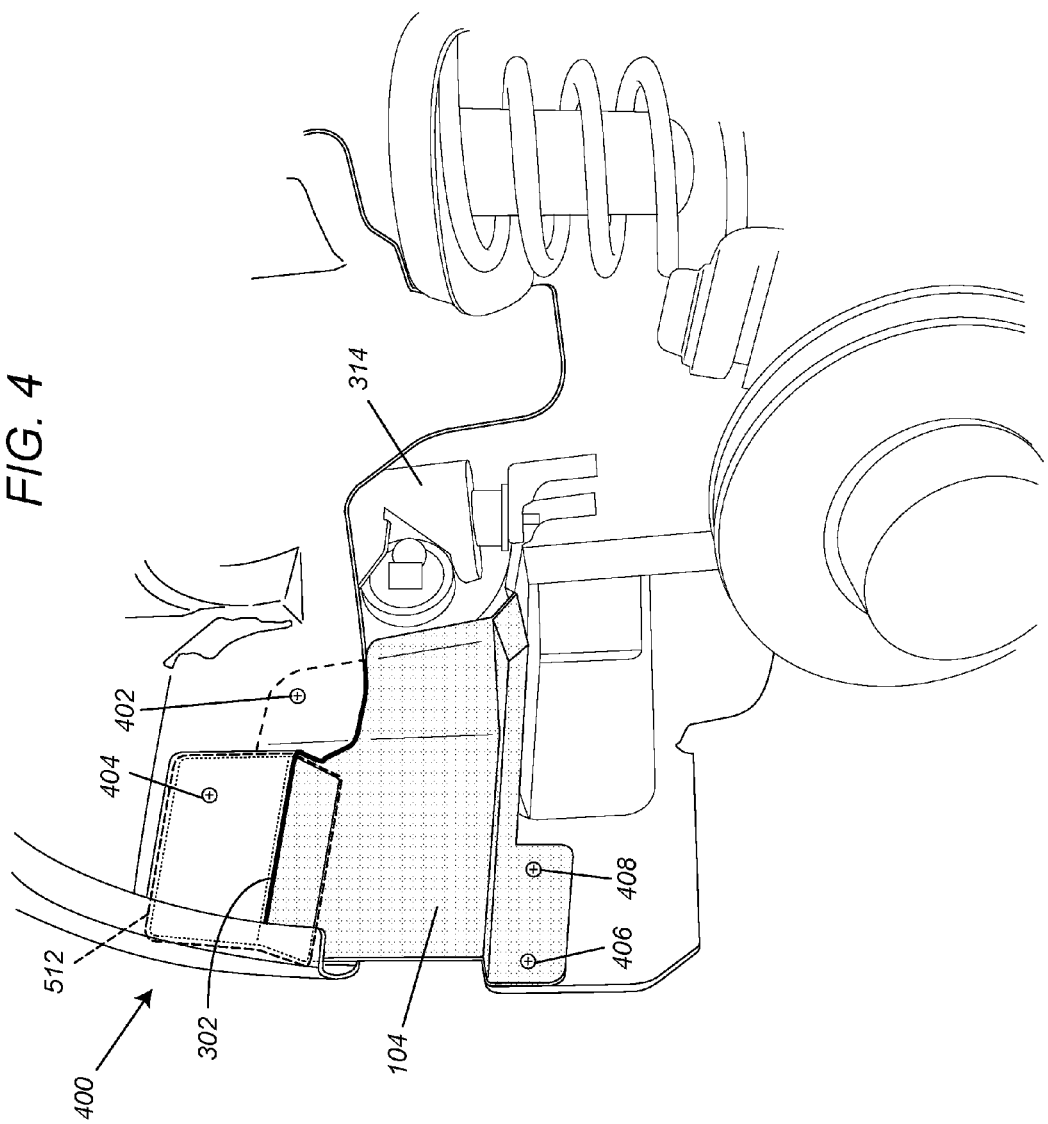

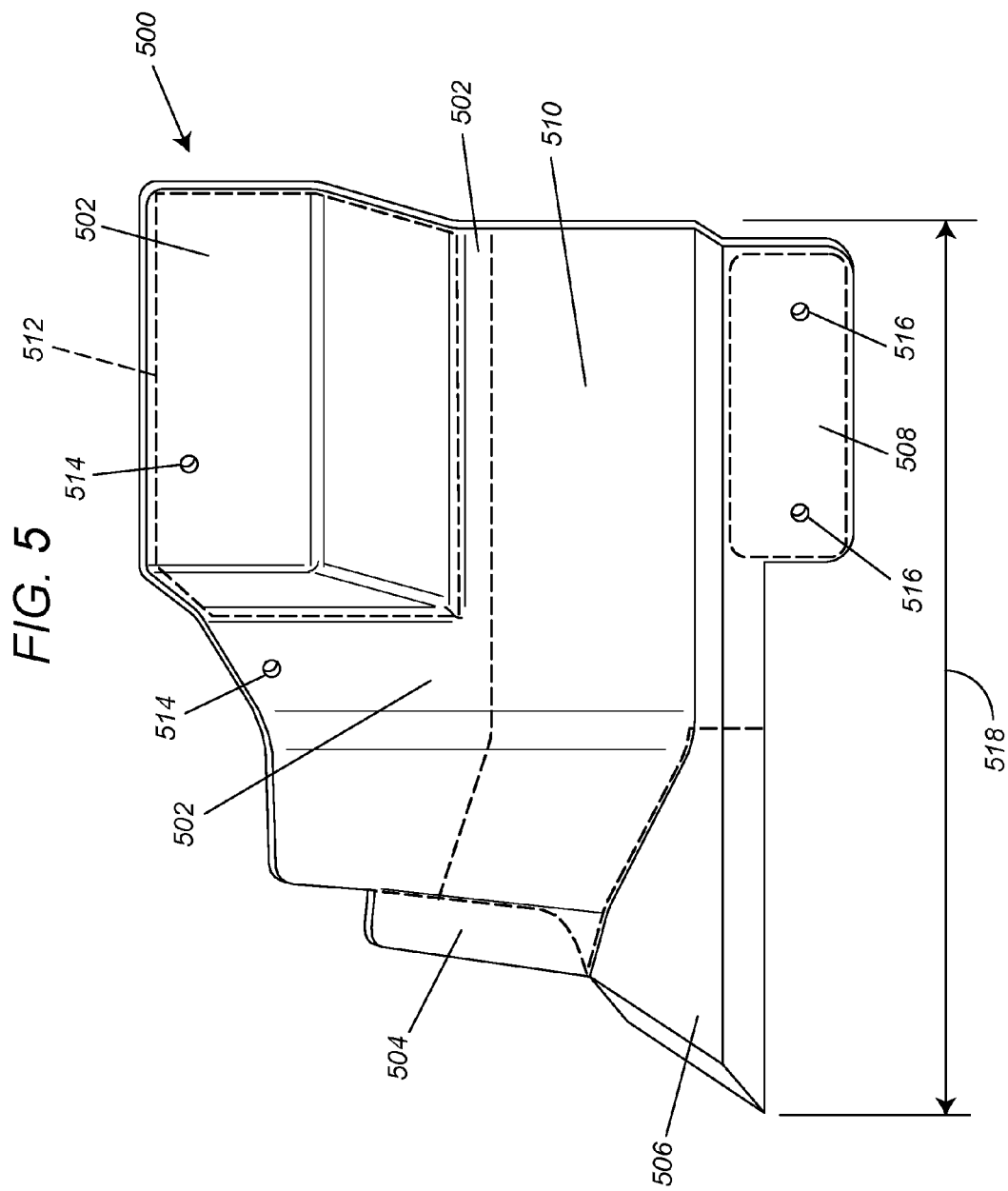

FENDER INTEGRATED AERODYNAMIC MUD, ROCK AND SPLASH GUARD

FIELD OF THE INVENTION

The present disclosure is in the field of mud flaps for vehicles and in particular, fender integrated rock guards, splashguards and/or mudguards.

BACKGROUND OF THE DISCLOSURE

The Jeep® Wrangler model of vehicle utilizes a front bumper, front fender and fender skirt configuration that afford a gap between the front bumper, front fender and fender skirt. In this configuration, the vehicle's front tires propel rocks, salt, water, mud, sand, and debris onto the front bumper, the radiator, the hood and the windshield via the gap between the front bumper, front fender and fender skirt. The result can not only damage the vehicle but also may create a dangerous situation if the windshield is significantly obstructed or damaged. Moreover, the gap between the front fender and the front bumper disrupts the aerodynamics of the vehicle as well.

Therefore, there is a need for a mud flap for the Jeep® Wrangler model of vehicles that corrects deficiencies resulting from the gap provided by the factory fender skirt, front fender and front bumper.

SUMMARY OF THE INVENTION

Disclosed herein is a fender integrated aerodynamic mud, rock and splash guard for a vehicle, comprising: a) a front surface, b) a back surface, c) a fender skirt portion, d) a bumper grill radiator portion, e) a behind grill portion, and f) a bumper tab portion, wherein the guard is adapted to be an extension of an inner fender skirt, wherein the guard is adapted to be an extension of an inner fender skirt, wherein the guard is affixed along a fender skirt edge, wherein the guard is configured to extend from the fender skirt edge along a portion of a front portion of a wheel well to overlap with a back portion of a front bumper, and wherein the front surface faces away from a volume of a wheel well and the back surface faces the volume of the wheel well.

BRIEF DESCRIPTION OF THE DRAWINGS

FIG. 3 is an illustration of a back view of the gap 204 provided by a fender skirt 310, a front fender 102 and a front bumper 106 on a Jeep® Wrangler 300.

FIG. 4 is an illustration of a back surface 400 of the guard 104 installed on a Jeep® Wrangler.

FIG. 5 is an illustration of a front surface 500 of the guard 104.

DETAILED DESCRIPTION OF THE EMBODIMENTS

The following is a detailed description of certain specific embodiments of the fender integrated aerodynamic mud, rock and splash guard for a vehicle disclosed herein.

In one aspect, disclosed herein is a fender integrated aerodynamic mud, rock and splash guard for a vehicle, comprising: a) a front surface, b) a back surface, c) a fender skirt portion, d) a bumper grill radiator portion, e) a behind grill portion, and f) a bumper tab portion, wherein the guard is adapted to be an extension of an inner fender skirt, wherein the guard is affixed to a fender skirt, wherein the guard is configured to extend from the fender skirt along a portion of a front portion of a wheel well to overlap with a back portion of a front bumper, wherein the front surface faces away from a volume of a wheel well and a back surface that faces the volume of the wheel well, and wherein the front surface is capable of blocking air flow, rocks, mud and/or debris from passing through a gap between the front bumper, grill, front fender and fender skirt on each side of the vehicle.

Figure 1:
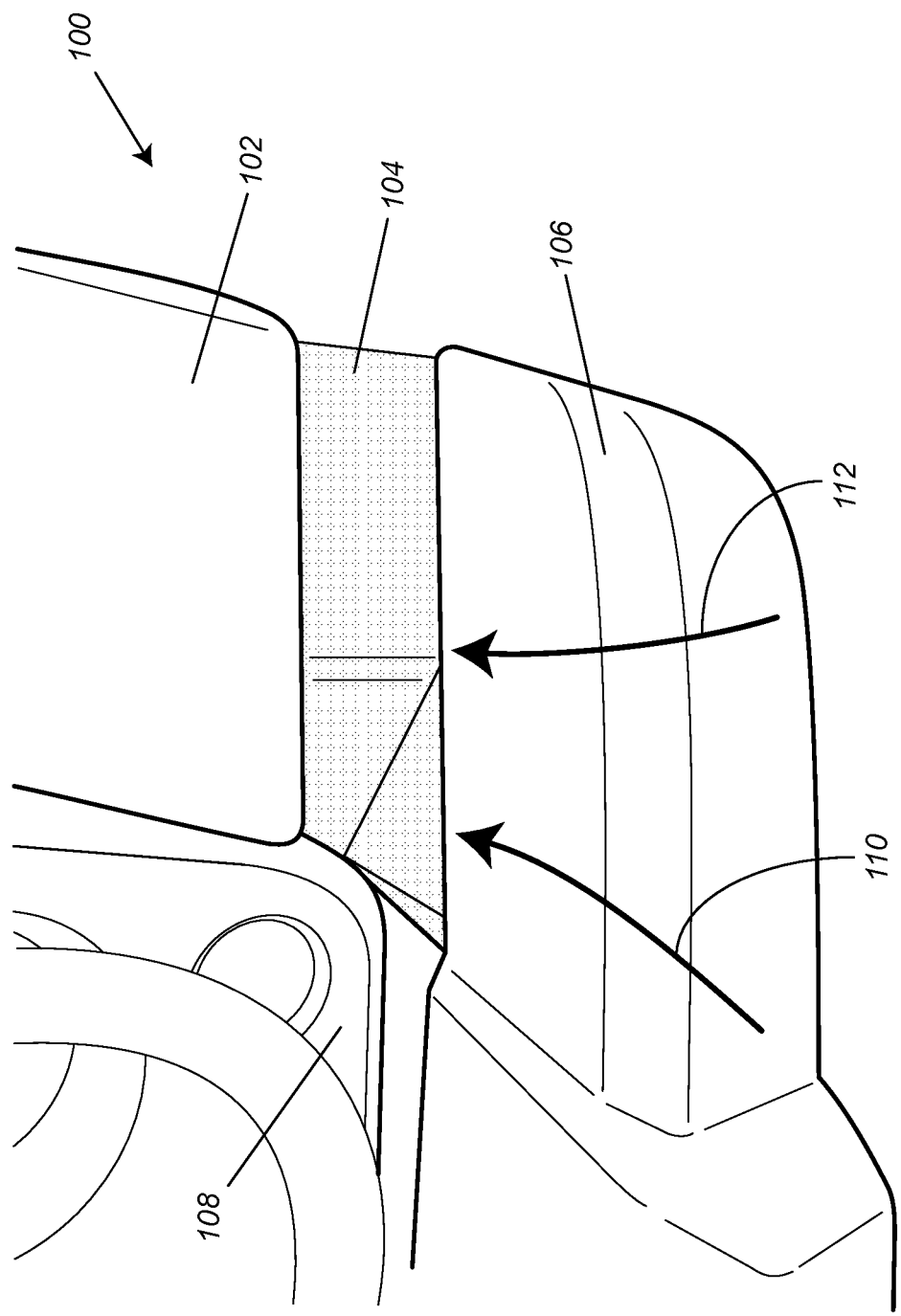
FIG. 1 is an illustration of a portion of a front surface 500 of the guard 104 installed on a Jeep® Wrangler 100.
Figure 2:
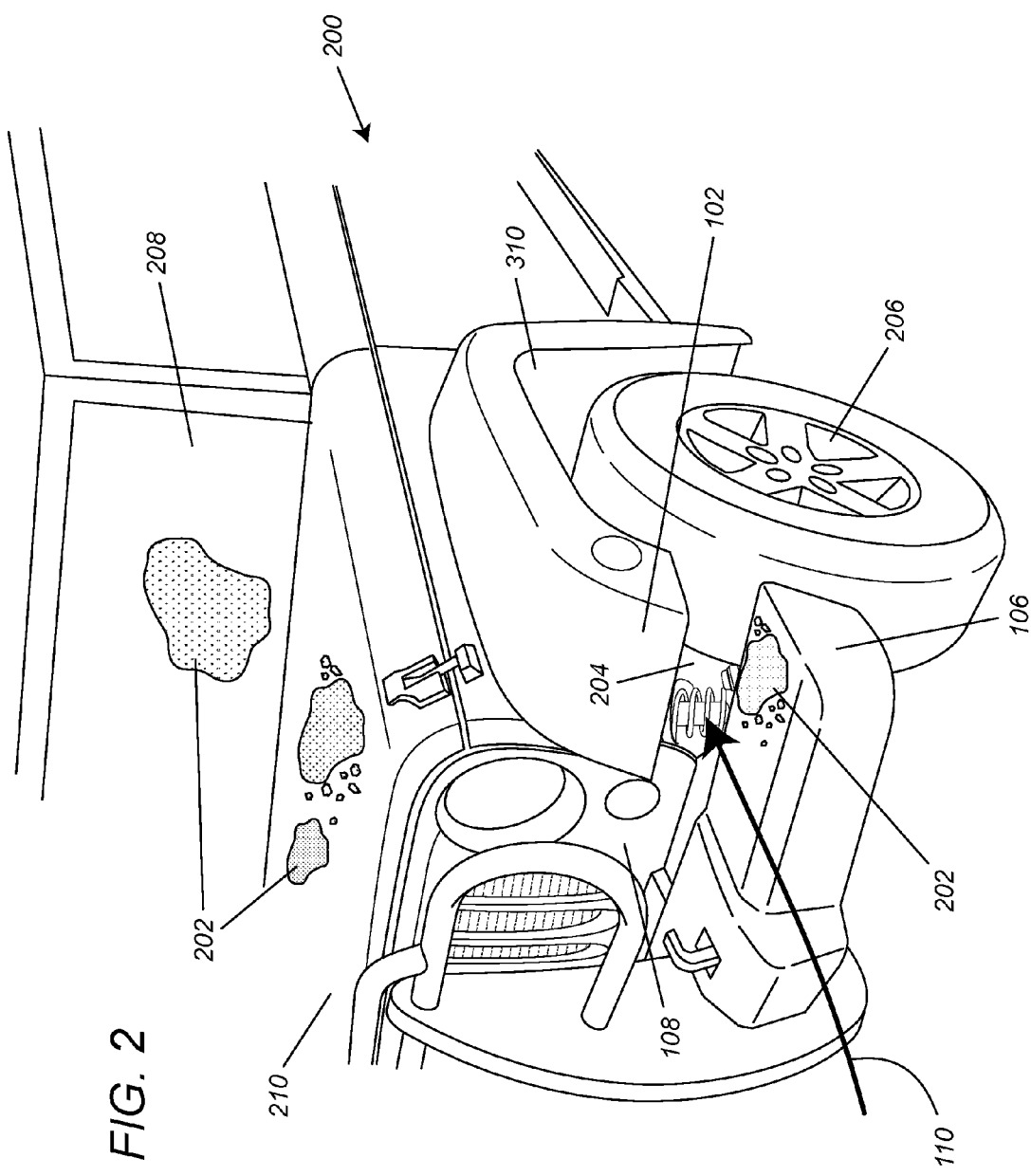
FIG. 2 is an illustration of a front view of the gap 204 provided by a fender skirt 310, a front fender 102 and a front bumper 106 on a Jeep® Wrangler 200.

Turning to the drawings, FIG. 1 depicts a front view of the guard 104 installed on a Jeep® Wrangler 100. In such embodiments, the guard 104 may be designed and manufactured (i.e., molded, shaped, trimmed, contoured, sized, etc.) specifically for a particular vehicle for which the guard 104 is to be attached (e.g., a Jeep® Wrangler vehicle). FIG. 2 depicts a front view of the gap 204 provided by a fender skirt 310, a front fender 102 and a front bumper 106 on a Jeep® Wrangler 200. Furthermore, FIG. 3 depicts a back view of the gap 204 provided by the fender skirt 310, front fender 102 and the front bumper 106 on the Jeep® Wrangler 300. During operation of the Jeep® Wrangler 200, the front wheels 206 will propel rocks, salt, water, mud, sand, and debris 202 onto the front bumper 106, the radiator 316, the hood 210 and the windshield 208 via the gap 204. In some embodiments, the front surface is capable of redirecting the air flow 112, and rocks, mud and/or debris from passing in a direction 110 through a gap between the front bumper, grill and front fender on each side of the vehicle. The rocks, mud and/or debris are propelled through the gap 204 in the direction 110 behind the grill 108 and into the radiator 314.

In this aspect, the rotation of the front wheels 206 propels rocks, salt, water, mud, sand, and debris in a first direction 304 onto the front bumper 106, the hood 210 and the windshield 208 via the gap 204. In another aspect, the rotation of the front wheels 206 propels rocks, salt, water, mud, sand, and debris in the first direction 304 and a second direction 306 onto the front bumper 106, the hood 210 and the windshield 208 via the gap 204. In yet another aspect, the rotation of the front wheels 206 propels rocks, salt, water, mud, sand, and debris in a third direction 308 into the radiator 314 between the radiator 314 and the grill 108. In some embodiments, the behind grill portion extends to a back side of the grill 316, and wherein the behind grill portion is capable of blocking rocks, mud and/or debris from striking a radiator and a backside of the grill.

FIG. 1 illustrates that the flow of air 112, whereby the guard 104 directs the air flow over the fender 102. In contrast, without the use of the guard 104 as illustrated in FIG. 2, the air flow is directed into the wheel well and into the front wheels thereby negatively impacting the aerodynamics of the vehicle. Moreover, the centrifugal force causing the rocks, salt, water, mud, sand, and debris 202 to fly forward towards the front bumper causes a drafting effect. This drafting effect circulates around the front of the vehicle and upward as well. The guard 104 as disclosed herein reduces or eliminates this drafting effect.

As depicted with FIG. 3, the fender skirt 310 terminates at the fender skirt edge 302. This view from behind the front bumper shows the gap 204 between the front bumper 106, front fender 102 and the fender skirt 310, whereby the skirt edge 302 has a curvature as depicted with FIGS. 3 and 4. FIG. 4 depicts a back surface 400 of the guard 104 installed on a Jeep® Wrangler. In some embodiments, the fender skirt portion comprising a curvature that is about the same as a curvature of the fender skirt edge. In some embodiments, the fender skirt portion comprising a curvature that is about the same as a curvature of the fender skirt edge, and wherein the guard is affixed to the fender skirt edge with a plurality of fasteners. In some embodiments, the fender skirt portion comprising a curvature that is about the same as a curvature of the fender skirt edge, and wherein the guard is molded with the fender skirt as a continuous fender skirt that comprises the guard.

The front surface 500 of the guard 104 presented with FIG. 5 illustrates a bumper mounting holes 516, fender skirt mounting holes 514, fender skirt portion 502, a front portion 510, a contoured portion 512, a bumper tab portion 508, a behind grill portion 504, and a bumper grill radiator portion 506. The contoured portion 512 as depicted with FIGS. 4 and 5 and encircled with a dotted line is molded and/or shaped to meet the contour of the skirt edge 302. In some embodiments, the fender skirt comprises a front portion defining a fender skirt portion channel adapted to receive the fender skirt portion. The fender skirt portion 502 is adapted to occupy the fender skirt channel 312 and is affixed to the fender skirt via fasteners 402 and 404 and affixed to the backside portion of the front bumper via fasteners 406 and 408. In this aspect, the fender skirt portion 502 together with the contoured portion 512 are capable of aligning with the curvature of the skirt edge 302 as depicted with FIGS. 3-5. Furthermore, the behind grill portion 504 is capable of preventing rocks, salt, water, mud, sand, and debris 202 being propelled from the third direction 308 to the back side of the grill 316 and into the radiator 314. The bumper grill radiator portion 506 is capable of engaging with the ledge 410 and continuing with the behind grill portion 504 to the back side of the grill 316. In some embodiments, washers, spacers, adhesive material, gaskets, or other fastening systems or components may be used for installation of a guard 104 according to the present disclosure. Moreover, FIG. 5 is an illustration of a driver side guard 104 of designed for a driver side front installation. In this aspect, a passenger side guard for a passenger side front installation is approximately a mirror image of the guard 104 of FIG. 5 of the disclosure herein. While the driver side fender skirt 310 of the vehicle 100 is shown in FIGS. 1-5, it should be appreciated by one of ordinary skill in the art that the driver side guard 104, as shown in FIGS. 1-5, would also have a similar assembly and construction. In some embodiments, the width 518 is between about 10 inches to 20 inches. In some embodiments, the width 518 is about 15 inches.

In some embodiments, the bumper tab portion extends from the front and back surfaces to overlap with a back side of the front bumper. In some embodiments, the bumper tab portion extends from the front and back surfaces to overlap with a back side of the front bumper, and wherein the bumper tab portion is affixed to the backside of the front bumper with a plurality of fasteners. In some embodiments, the bumper tab portion extends from the front and back surfaces to overlap with a back side of the front bumper, wherein the bumper tab portion is affixed to the backside of the front bumper with a plurality of fasteners, and wherein the guard is molded with the fender skirt as a continuous fender skirt that comprises the guard.

The guard 104 as disclosed herein may be of a single-piece construction and formed of a durable plastic material such as high density polyethylene (HDPE) or discarded rubber tires. In some embodiments, the guard 104 is constructed from plastic derived from polyethylene, polyethylene (HDPE) and/or polypropylene. Additional examples may include low density polyethylene (LDPE), linear low density polyethylene (LLDPE), polypropylene, polybutylene and copolymers of ethylene such as polyethylene-vinyl acetate (EVA), polyethylene-acrylic acid (EAA), polyethylene-methacrylic acid EMA) or copolymers of ethylene or propylene with the lower olefins such as, butene-1, pentene-1, hexene or octane, or a combination thereof.

In this manner, the guard 104 as disclosed herein is a molded extension of the inner fender skirt 310. Once installed, the guard 104 encases about 90% to 100% of the gap 204 between the front bumper 106, front fender 102 and fender skirt 310. In some embodiments, the guard 104 encases about 98% to 100% of the gap 204 between the front bumper 106, front fender 102 and fender skirt 310. In some embodiments, the front surface, back surface, fender skirt portion, bumper grill radiator portion, behind grill portion, and bumper tab portion are configured to extend into the wheel well in front of the skirt, and wherein the front surface, back surface, fender skirt portion, bumper grill radiator portion, behind grill portion, and bumper tab portion are further configured to extend under the vehicle behind or in front of the fender skirt. In some embodiments, the front surface, back surface, fender skirt portion, bumper grill radiator portion, behind grill portion, and bumper tab portion defines a portion of the fender skirt.

Moreover, the guard 104 as disclosed herein is designed and contoured to stop 90% to 100% of rocks, salt, water, mud, sand, and debris from being thrown forward by the front wheels onto the front bumper and into the radiator. During the winter months ice buildup on the inner wheel well and tires was considered in the design of the guard 104 whereby the guard 104 is contoured and molded in an offset manner to remain clear of the tire rotation during times of ice buildup within the wheel well. The use of the guard 500 while reducing or eliminating mud and dirt from splashing on the front bumper, hood, etc., which reduces the number of trips to the car wash as depicted with the rocks, salt, water, mud, sand, and debris 202 as illustrated with FIG. 2.

DEFINITIONS

The term "vehicle", refers to all Jeep® Wrangler model vehicles.

As used herein, relative spatial terms such as in front of, behind, under, front, rear, forward, left, right, top, bottom, etc. relate to the orientation of a corresponding vehicle.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or devices, which can of course vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict any definitions in this disclosure.

What is claimed is:

1. A fender integrated aerodynamic mud, rock and splash guard for a vehicle having a gap between a fender and a bumper, said guard comprising:
   a) a front surface,
   b) a back surface,
   c) a fender skirt portion,
   d) a bumper grill radiator portion,
   e) a behind grill portion, and
   f) a bumper tab portion,
   wherein the guard is adapted to be an extension of an inner fender skirt, wherein the guard is affixed along a fender skirt edge, wherein the guard is configured to extend from the fender skirt edge along a portion of a front portion of a wheel well to overlap with a back portion of a front bumper, and wherein the front surface faces away from a volume of a wheel well and the back surface faces the volume of the wheel well, minimizing the gap formed by said fender and said bumper.

2. The guard of claim 1, wherein the front surface is capable of blocking air flow, rocks, mud and/or debris from passing through a gap between the front bumper, grill, front fender and fender skirt on each front side of the vehicle.

3. The guard of claim 1, wherein the fender skirt portion comprising a curvature that is about the same as a curvature of the fender skirt edge.

4. The guard of claim 1, wherein the fender skirt portion comprising a curvature that is about the same as a curvature of the fender skirt edge, and wherein the guard is affixed to the fender skirt with a plurality of fasteners.

5. The guard of claim 1, wherein the fender skirt portion comprising a curvature that is about the same as a curvature of the fender skirt edge, and wherein the guard is molded with the fender skirt as a continuous fender skirt that comprises the guard.

6. The guard of claim 1, wherein the behind grill portion extends to a back side of the grill.

7. The guard of claim 1, wherein the behind grill portion extends to a back side of the grill, and wherein the behind grill portion is capable of blocking rocks, mud and/or debris from striking a radiator and a backside of the grill.

8. The guard of claim 1, wherein the bumper tab portion extends from the front and back surfaces to overlap with a back side of the front bumper.

9. The guard of claim 1, wherein the bumper tab portion extends from the front and back surfaces to overlap with a back side of the front bumper, and wherein the bumper tab portion is affixed to the backside of the front bumper with a plurality of fasteners.

10. The guard of claim 1, wherein the bumper tab portion extends from the front and back surfaces to overlap with a back side of the front bumper, wherein the bumper tab portion is affixed to the backside of the front bumper with a plurality of fasteners, and wherein the guard is molded with the fender skirt as a continuous fender skirt that comprises the guard.

11. The guard of claim 1, wherein the front surface, back surface, fender skirt portion, bumper grill radiator portion, behind grill portion, and bumper tab portion are configured to extend into the wheel well in front of the skirt, and wherein the front surface, back surface, fender skirt portion, bumper grill radiator portion, behind grill portion, and bumper tab are further configured to extend under the vehicle behind or in front of the fender skirt.

12. The guard of claim 1, wherein the front surface, back surface, fender skirt portion, bumper grill radiator portion, behind grill portion, and bumper tab defines a portion of the fender skirt.

13. The guard of claim 1, wherein the fender skirt comprises a fender skirt edge defining a fender skirt channel adapted to receive the fender skirt portion.

14. A vehicle comprising the guard of claim 1.

15. Use of the guard of claim 1 for minimizing a gap formed by a fender and a bumper.

* * * * *